United States Patent [19]
Saponara

[11] 3,786,274

[45] Jan. 15, 1974

[54] CONTROL APPARATUS

[75] Inventor: Domenick Saponara, Macungie, Pa.

[73] Assignee: International Telephone and Telegraph Corporation, New York, N.Y.

[22] Filed: Feb. 20, 1973

[21] Appl. No.: 334,057

Related U.S. Application Data

[62] Division of Ser. No. 168,077, Aug. 2, 1971, Pat. No. 3,754,703.

[52] U.S. Cl. .................................. 307/117, 317/9 A
[51] Int. Cl. ........................................... H01h 47/24
[58] Field of Search .................. 307/117, 118, 116, 307/112; 317/40, 9 R, 9 A

[56] References Cited
UNITED STATES PATENTS

| | | | |
|---|---|---|---|
| 2,217,785 | 10/1940 | Betz et al. | 307/117 UX |
| 2,249,442 | 7/1941 | Thornberry | 307/117 UX |

*Primary Examiner*—Herman J. Hohauser
*Attorney*—A. Donald Stolzy

[57] ABSTRACT

A control assembly to operate a gas oven. The main burner receives gas from a solenoid valve energized by a thermoelectric generator through a main thermostat switch. In order to reduce the oven temperature to, e.g. 170° F. to keep the food warm after a timer has run down, the timer and a keep-warm thermostat operate two switches, respectively, to short circuit the solenoid or the thermoelectric generator periodically. The thermoelectric generator output is in the millivolt region. Thus, use of one or two additional, inexpensive, series switches in the circuit can make solenoid operation unreliable because of even moderate contact resistance. Even the use of expensive gold may not avoid the series switch problem. The control assembly disclosed herein avoids this problem by use of a disabling shunt instead of a series switch.

2 Claims, 5 Drawing Figures

PATENTED JAN 15 1974

CONTROL APPARATUS

This is a division of copending application Ser. No. 168,077 filed Aug. 2, 1971 now U.S. Pat. No. 3,754,703. The benefit of the filing date of said copending application is, therefore, hereby claimed for this application.

BACKGROUND OF THE INVENTION

This invention relates to electrical devices for energization by the output voltage of a thermoelectric generator including at least a thermopile, and more particularly, to a control assembly to deenergize such a device without opening the circuit between the device and the thermocouple.

Although the device of the present invention will have considerable utility when used in connection with an oven for a gas range in which food is cooked, the invention is not limited to this or any other application described herein. It will, thus, have other useful applications.

In the past, a thermocouple has been connected in series with a main thermostat switch and a gas range. Thus, the thermocouple supplies an exciting voltage for the solenoid in the millivolt region.

It is also old in the art to automatically reduce oven temperature by the use of a timer. Typically, the temperature is reduced to 170° F. to hold the food at serving temperature after it has cooked. However, if attempts are made to do this electrically in a millivolt system by opening the circuit, additional series contacts must be used. The addition of additional series contact resistances can make the system unreliable. The reliability problem can be alleviated to some extent by the use of gold or platinum contacts but this adds expense.

SUMMARY OF THE INVENTION

In accordance with the device of the present invention, the above-described and other disadvantages of the prior art are overcome by short circuiting a thermocouple or the load connected thereto. In either case, the load is disabled. However, no disadvantages are attendant upon the short circuiting of the thermoelectric generator or the load.

By short circuiting, no extra pair of contacts are needed in series with the thermoelectric generator. The available E.M.F., therefore, remains high because additional contact resistance is absent. Further, inexpensive shorting contacts may be employed because they need not be gold or platinum.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENTS

Figure 1:
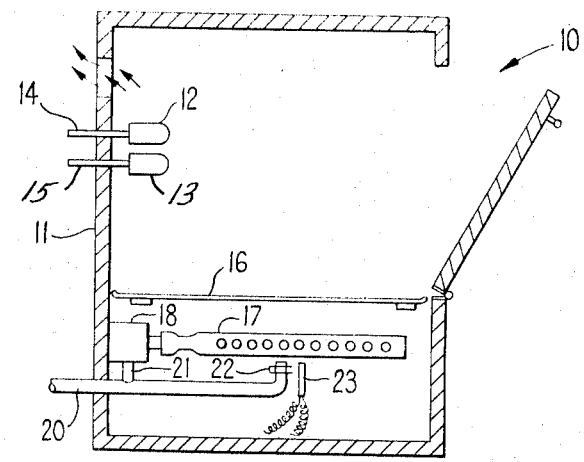
FIG. 1 is a vertical sectional view through a gas oven.

In FIG. 1, an oven is indicated at 10 having a housing 11. A pair of bulbs 12 and 13 are fixed inside housing 11. A pair of tubes 14 and 15 are connected from bulbs 12 and 13, respectively. The interior of tubes 14 and 15 lie in communication with the interiors of bulbs 12 and 13, respectively. Junctions 12 and 13 are thus hollow. Junctions 12 and 13 and tubes 14 and 15 are filled with a thermally expansible liquid. The manner in which bulbs 12 and 13 are used will be described hereinafter.

Figure 4:
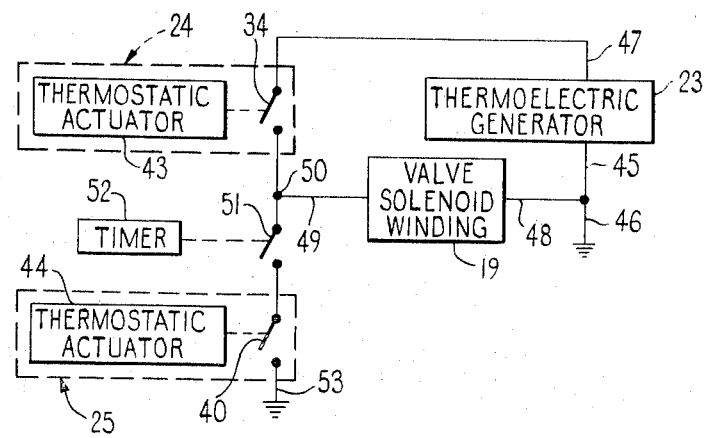
FIG. 4 is a block diagram of one embodiment of the present invention.
Figure 5:
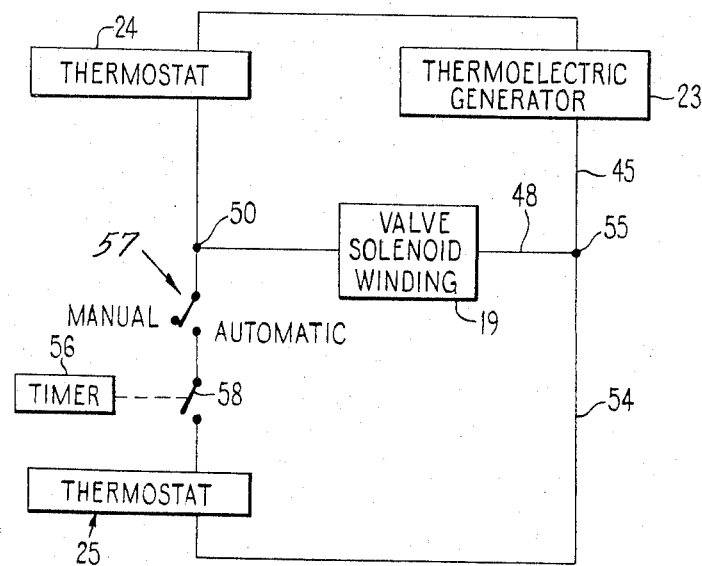
FIG. 5 is a block diagram of another embodiment of the present invention.

A partition 16 is fixed inside oven 10 to housing 11. A main burner 17 is also fixed inside housing 11. A solenoid valve 18 having a winding 19 shown in FIGS. 4 and 5 is connected from a gas input conduit 20 at a pipe T 21. Inlet 20 is also connected to a pilot burner 22. A thermoelectric generator 23 is located adjacent pilot burner 22 to be heated by the heat of combustion generated by gas burning a pilot burner 22.

It is not conventional to employ two bulbs 12 and 13 and two tubes 14 and 15 in FIG. 1. However, all of the apparatus shown in FIG. 1, except the two bulbs 12 and 13, and the two tubes 14 and 15 may be entirely conventional.

Thermostats are shown at 24 and 25 in FIGS. 4 and 5. Thermostat 24 includes bulb 12, tube 14, and all the structure other than tube 14, shown in FIG. 2. Note will be taken that tube 14 is connected to a bellows 26 which operates a lever 27 biased by a spring 28. Lever 27 is fulcrumed on the end of a shaft 29 threaded through a housing 30. The rotatable position of shaft 29 is manually adjustable by a knob 31.

Repeated expansion and contraction of bellows 26 will cause repeated opening of leaf spring contacts 32 and 33 of a switch 34 when the liquid in bulb 12 expands and contracts, respectively.

Figure 2:
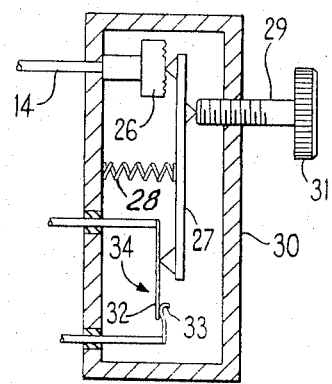
FIG. 2 is a vertical sectional view of a portion of a thermostatic actuator.

Bulb 12, tube 14 and all of the structure shown in FIG. 2 may be entirely conventional. The cooking temperature of the oven 10 may thus be set by turning knob 31 from zero to some baking temperature.

Thermostat 25 operates differently from thermostat 24. Thermostat 25 includes bulb 13, tube 15 and all the structure connected from tube 15, shown in FIG. 3. Thermostat 25 includes a bellows 35, a lever 36 and a spring 37 which may be, if desired, identical to bellows 26, lever 27 and spring 28. A set screw 38 is threaded through housing 39 to set the "keep warm" temperature of the oven.

Figure 3:
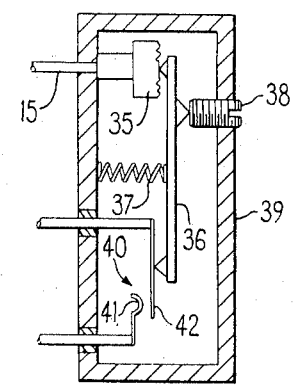
FIG. 3 is a vertical sectional view of a portion of another thermostatic actuator.

The apparatus of FIG. 3 includes a switch 40 having leaf spring contacts 41 and 42 which are engaged when bellows 35 expands. Thus, switch 40 closes when bellows 35 expands, whereas switch 34 opens when bellows 26 expands.

As shown in FIG. 4, all of the structure of thermostat 24 is labeled "thermostatic actuator" at 43, with the exception of switch 34. Similarly, all of the structure of thermostat 25 is labeled "thermostatic actuator" 44, with the exception of switch 40.

Thermoelectric generator 23 has one lead 45 connected to ground at 46, and another lead 47 connected to switch 34.

Winding 19 has one lead 48 connected to ground at 46, and another lead 49 connected to a junction 50.

Junction 50 is connected to both switch 34 and to a timer switch 51, timer switch 51 being operated by a timer 52.

The timer switch 51, in turn, is connected to thermostat switch 40, the other side of thermostat switch 40 being grounded at 53.

In the embodiment of FIG. 4, timer 52 is of the type that keeps switch 51 open until it runs down to time ZERO. Switch 51 is then closed. Timer 52 is also of the type which may be located from a ZERO position to an OFF position where switch 51 is open to turn the keep warm control off.

In the operation of the embodiment of FIG. 4, knob 31 is turned to the desired cooking temperature. Actuator 43 then closes switch 34 until the temperature inside housing 11 rises to the temperature set by turning knob 31. When the housing temperature rises above the set temperature, actuator 43 opens switch 34. When the temperature inside housing 11 falls below the set temperature, actuator 43 closes switch 34, and so on. The foregoing is the operation with the timer 52 in the OFF position. Should it be desired to bake at the set temperature for a predetermined time and then to reduce the temperature inside housing 11 to, for example, 170° F., timer 52 is set to the baking time. Switch 51 is thus kept open and baking occurs as previously described until the timer 52 returns to the ZERO position. Switch 51 is then closed. The actuator 44 has previously closed switch 40. The closure of switch 40 short circuits winding 19 through switch 51 to ground. Thermostat 25 thus acts as an override and lowers the temperature inside housing 11 to, for example, 170° F. When the temperature inside housing 11 falls below 170° F., the liquid inside bellows 35 will contract sufficiently to open switch 40 and remove the short circuit across winding 19. Thermostat 25 will thus keep the temperature inside oven 11 at, for example, 170° F. until timer 52 is turned to the OFF position.

As shown in FIG. 5, it is unnecessary to have a ground connection. Winding lead 48 may thus be connected to thermostat 25 by a lead 54, thermoelectric generator lead 45 being connected to both leads 48 and 54 at a junction 55.

Although timer 52 may be entirely conventional, a timer 56 may also be employed of a simpler nature, timer 56 also being conventional. Timer 56 need not have an OFF position spaced from a ZERO position, as described previously, in connection with timer 52. In this case, a single-pole, double-throw switch 57 is connected from junction 50 through a switch 58 operated by timer 56 to thermostat 25. Thus, to shut off the keep warm, switch 57 is opened by switching to the manual position. Timer 56 thus keeps switch 58 open at all times except when it is in the ZERO position. In the ZERO position, timer 56 closes switch 58.

Both of the embodiments shown in FIGS. 4 and 5 are employed to short circuit winding 19. However, this is not necessary. That is, the invention may be practiced also by simply short circuiting thermoelectric generator 23.

Note will be taken that switches 34, 51, 40, 57 and 58 may either be mechanical, solid state or other switches. That is, the same or similar references to "stable states" herein and in the claims is hereby defined to include mechanical and/or electrical stable states.

What is claimed is:

1. A thermoelectric generator and a gas valve solenoid winding connected in series circuit, temperature responsive means responsive to a first temperature for actuating a first switch, temperature responsive means responsive to a second temperature for actuating a second switch, means connecting at least one of said switches in parallel with one of said generator and said solenoid winding for interrupting current in said winding when its temperature is exceeded and means converting the other of said switches to interrupt the current in said winding when its temperature is exceeded.

2. The combination of claim 1, including timer means connected in said circuit to cause the one of said temperature responsive means responsive to the lower temperature to be ineffective when said timer is running and to be effective after said timer has run.

* * * * *